US009767448B2

(12) United States Patent
Serrano

(10) Patent No.: US 9,767,448 B2
(45) Date of Patent: *Sep. 19, 2017

(54) USER-FRIENDLY TRANSACTION INTERFACE

(71) Applicant: PayPal, Inc., San Jose, CA (US)

(72) Inventor: Michelle Serrano, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/349,846

(22) Filed: Nov. 11, 2016

(65) Prior Publication Data

US 2017/0061420 A1 Mar. 2, 2017

Related U.S. Application Data

(63) Continuation of application No. 14/558,656, filed on Dec. 2, 2014.

(51) Int. Cl.
| | |
|---|---|
| G07F 19/00 | (2006.01) |
| G06Q 20/32 | (2012.01) |
| G06F 3/01 | (2006.01) |
| G06F 3/0488 | (2013.01) |
| G06F 3/0482 | (2013.01) |
| G06F 3/0484 | (2013.01) |
| G06F 3/0486 | (2013.01) |

(52) U.S. Cl.
CPC .......... *G06Q 20/322* (2013.01); *G06F 3/017* (2013.01); *G06F 3/0482* (2013.01); *G06F 3/0486* (2013.01); *G06F 3/04847* (2013.01); *G06F 3/04883* (2013.01); *G06Q 20/32* (2013.01)

(58) Field of Classification Search
CPC ... G07F 7/1008; G07F 19/20; G06Q 20/1085; G06Q 30/02; G06Q 20/341
USPC ....................................... 235/375, 379, 380
See application file for complete search history.

(56) References Cited

U.S. PATENT DOCUMENTS

| | | |
|---|---|---|
| 2012/0310826 A1 | 12/2012 | Chatterjee |
| 2014/0123043 A1 | 5/2014 | Schmidt et al. |
| 2014/0156470 A1 | 6/2014 | Raman |
| 2014/0279543 A1 | 9/2014 | Ruhrig |
| 2015/0134507 A1 | 5/2015 | Lucas et al. |

*Primary Examiner* — Karl D Frech
(74) *Attorney, Agent, or Firm* — Haynes and Boone, LLP

(57) ABSTRACT

Methods and systems for facilitating electronic transactions on a user device are described. User-friendly graphical user interfaces (GUIs) are provided with minimal text and more pictures and images. The GUIs detect or receive various gesture inputs, such as swiping, tapping, and dragging and dropping, and display a corresponding screen or page. The gesture inputs allow a user to select or specify payers/ payees, transaction amounts, and funding sources, without having to type numbers or letters.

20 Claims, 16 Drawing Sheets

USER-FRIENDLY TRANSACTION INTERFACE

CROSS-REFERENCE TO RELATED APPLICATIONS

This application is a continuation of Ser. No. 14/558,656, filed Dec. 2, 2014, which is incorporated herein by reference in its entirety.

BACKGROUND

Field of the Invention

The present invention generally relates to user interfaces that facilitate electronic transactions on user devices, and more specifically to graphical user interfaces that detect gesture inputs and use minimal text and more pictures and images.

Related Art

Mobile payment services are popular among consumers because of their convenience. Typically, the mobile payment service is provided through a graphical user interface generated as a result of executing a service application and displayed on user devices. Such a graphical user interface typically shows various types of information on a merchant, a desired purchase, and payment instruments.

Most graphical user interfaces require a lot of reading and clicking to process payment requests, which can be inconvenient for a consumer. Thus, a need exists for a simpler, more intuitive way to make payments on user devices.

Figure 1:
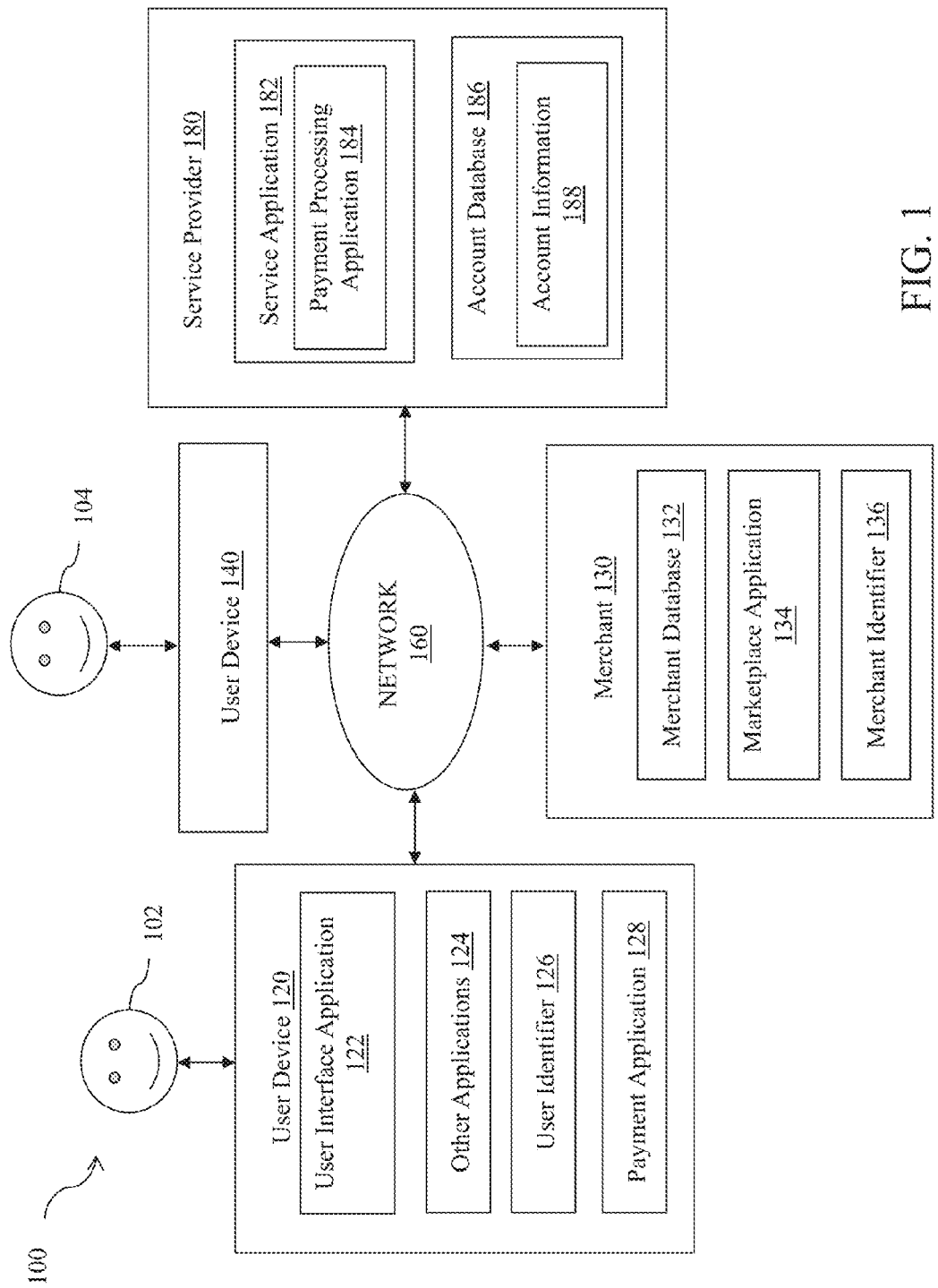
FIG. 1 is a block diagram illustrating a system for facilitating an electronic transaction on a user device according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The systems and methods described herein provide user-friendly graphical user interfaces (GUIs) that facilitate electronic transactions, such as payments on a user device. The GUIs may be used to send or request payment. In various embodiments, the GUIs include colors, bigger font sizes, less words, animation, simple graphics, and/or visual indicators for generally time-consuming actions. The GUIs allow a user to use gestures to input payment details, such as payee/merchant, payer, transaction amounts, and/or payment or funding sources.

A GUI representing a main page is displayed to a user on a user device. The GUI, in various embodiments, includes the user's group of contacts (e.g., friends or merchants that the user has had financial transactions with in the past). In response to detected or received gesture inputs, the user device displays various graphical elements. For example, if the user taps on an image of a contact, the image of the contact is enlarged, and the user can engage in financial transactions with the contact. In certain embodiments, the user wants to send a payment to the contact. By using various gesture inputs such as swiping, tapping, tracing, and dragging and dropping, the user is able to select or specify the payment amount and the funding source and complete the transaction. The degree of the gesture input, in one embodiment, can be used to specify payment amounts. For example, the longer the length of a swiping gesture, the greater the amount to be paid. In some embodiments, the user wants to request payment from the contact. In another embodiment, the speed of the gesture input indicates how fast to increase the payment amount.

FIG. 1 shows one embodiment of a block diagram of a network-based system 100 adapted to facilitate an electronic transaction on a user device, such as user devices 120 and 140 over a network 160. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a first user device 120 (e.g., a smartphone), one or more merchant servers or devices 130 (e.g., network server devices), a second user device 140 (e.g., a smartphone) and at least one service provider server or device 180 (e.g., network server device) in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. As such, in various embodiments, the user devices 120 and 140, merchant servers or devices 130, and service provider server or device 180 may be associated with a particular link (e.g., a link, such as a URL (Uniform Resource Locator) to an IP (Internet Protocol) address).

The first user device 120 and second user device 140, in one embodiment, may be utilized by first user 102 and second user 104 to interact with the service provider server 180 over the network 160. For example, users 102 and 104 may conduct financial transactions (e.g., account transfers)

with the service provider server 180 and with each other via the user devices 120 and 140.

The first user device 120 and second user device 140, in various embodiments, may be implemented using any appropriate combination of hardware and/or software configured for wired and/or wireless communication over the network 160. The first user device 120, in one embodiment, may be utilized by the first user 102 to interact with the service provider server 180 over the network 160. The second user device 140, in turn, may be used by the second user 104 to interact with the service provider server 180. For example, the first user 102 may conduct financial transactions (e.g., account transfers) with the service provider server 180 via the user device 120. In various implementations, the user device 120 may include at least one of a wireless cellular phone, personal digital assistant (PDA), satellite phone, wearable computing device, mobile device, etc.

The first user device 120, in one embodiment, includes a user interface application 122, which may be utilized by the first user 102 to conduct transactions (e.g., shopping, purchasing, bidding, payment, etc.) with the second user device 140, merchant server or device 130 or with the service provider server 180 over the network 160. In one aspect, purchase expenses may be directly and/or automatically debited from an account related to the first user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the first user 102 is able to access merchant websites via the one or more merchant servers 130 to view and select items for purchase, and the first user 102 is able to purchase items from the one or more merchant servers 130 via the service provider server 180. Accordingly, in one or more embodiments, the first user 102 may conduct transactions (e.g., purchase and provide payment for one or more items) from the one or more merchant servers 130 via the service provider server 180.

The first user device 120, in various embodiments, may include other applications 124 as may be desired in one or more embodiments of the present disclosure to provide additional features available to the first user 102. In one example, such other applications 124 may include security applications for implementing client-side security features, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the first user 102 based on activity from the first user device 120 (e.g., cell phone), and for the second user 104 based on activity from the second user device 140. The user profile may be updated with each financial and/or information transaction (e.g., payment transaction, purchase transaction, etc.) achieved through use of the user devices 120 and 140. In various aspects, this may include the type of transaction and/or the location information from the user devices 120 and 140. As such, the profile may be used for recognizing patterns of potential fraud, setting transaction limits on the user, etc.

The first user device 120, in one embodiment, may include at least one user identifier 126, which may be implemented, for example, as operating system registry entries, cookies associated with the user interface application 122, identifiers associated with hardware of the first user device 120, or various other appropriate identifiers. The user identifier 126 may include one or more attributes related to the first user 102, such as personal information related to the first user 102 (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the first user 102 with a particular user account maintained by the service provider server 180.

In certain embodiments, first user device 120 includes a payment application 128. In one embodiment, a service provider distributes the payment application 128 to first user device 120 over the network 160. In some embodiments, the payment application 128 receives user information and creates a user profile containing the user information. The payment application 128, in various embodiments, collects information regarding financial transactions of user 102, including who user 102 has paid or received payment from (e.g., merchants, friends, co-workers, etc.), amounts involved in the transactions, and payment instruments used in the transactions. In some embodiments, the payment application 128 receives or detects various user inputs and generates a graphical user interface based on the inputs.

Second user device 140 may have similar applications and modules as first user device 120, although not specifically shown. Second user device 140 may also include a user interface application 122 and one or more other applications 124 which may be used, for example, to provide a convenient interface to permit second user 104 to browse information over network 160. For example, in one embodiment, user interface application 122 may be implemented as a web browser configured to view information available over the Internet and communicate with service provider server 180.

Second user device 140 may further include other applications 124 such as security applications for implementing client-side security features, programmatic client applications for interfacing with appropriate application programming interfaces (APIs) over network 160, or other types of applications. Applications 124 may also include email, text, IM, and voice applications that allow second user 104 to communicate through network 160, receive messages from first user 102, and create and manage funding sources. Second user device 140 includes one or more user identifiers 126 which may be implemented, for example, as operating system registry entries, cookies associated with user interface application 122, identifiers associated with hardware of second user device 140, or other appropriate identifiers, such as used for payment/recipient/device authentication, e.g., the phone number associated with second user device 140.

Identifiers may be used by a service provider to associate second user 104 with a particular account maintained by the service provider. Second user device may also include payment application 128.

User devices 120, 140 each also include a display to present a GUI for various types of applications. The display may be a liquid crystal display, a thin film transistor-liquid crystal display, an organic light-emitting diode, a flexible display, or 3D display, but is not limited thereto.

In various embodiments, the display is a touch screen configured to receive inputs and to display information. The display may include a touch sensor layered on or beneath the display. The touch sensor is configured to detect a touch input. The touch sensor may be a touch film, a touch sheet, or a touch pad. The touch sensor may be configured to convert a pressure applied to or a change in capacitance around a particular place on the display into an electric input signal. The touch sensor may detect a pressure, a particular location where a touch input is made, or a direction of a touch input. When the touch sensor detects a touch input, the touch sensor sends a corresponding electric input signal to a touch controller. The touch controller processes the electric input signal and sends corresponding data to a main controller. The touch controller determines an area of the display where the touch input is made.

The touch screen may display one or more graphical elements as a user interface. Such a touch screen enables a user to select or to activate an operation associated with at least one graphical element displayed thereon. For example, a user can select or activate at least one graphical element by touching the graphical element using one or more fingers or by releasing the touched graphical element. The touch screen may detect various types of gesture inputs. The gesture inputs may include a touch input, a tap input, a double tap input, a hold input, a touch and move input, a flick or swipe input, and a drag and drop input, including performing one or more gestures at different speeds to perform different actions. The touch input may initiate operation for selecting a predetermined graphical element or an area around a predetermined graphical element. The tap input may initiate operation for executing an application associated with a predetermined graphical element. The double-tap input may initiate operation for controlling (e.g., enlarging or reducing) a size of a graphical element. The hold input may initiate operation for activating a detailed menu associated with a selected graphical element. The touch and move input may initiate operation for scrolling a graphical element. The flick or swipe input may initiate operation for moving in and out of the layers of graphical elements. The drag and drop input may initiate operation for moving selected graphical elements.

In some embodiments, the touch screen includes a multi-touchscreen. Multi-touchscreens can recognize multiple points of contact simultaneously and hence are able to detect several fingers of a user. This increases the number of possible gestures that are detected.

Figure 2:
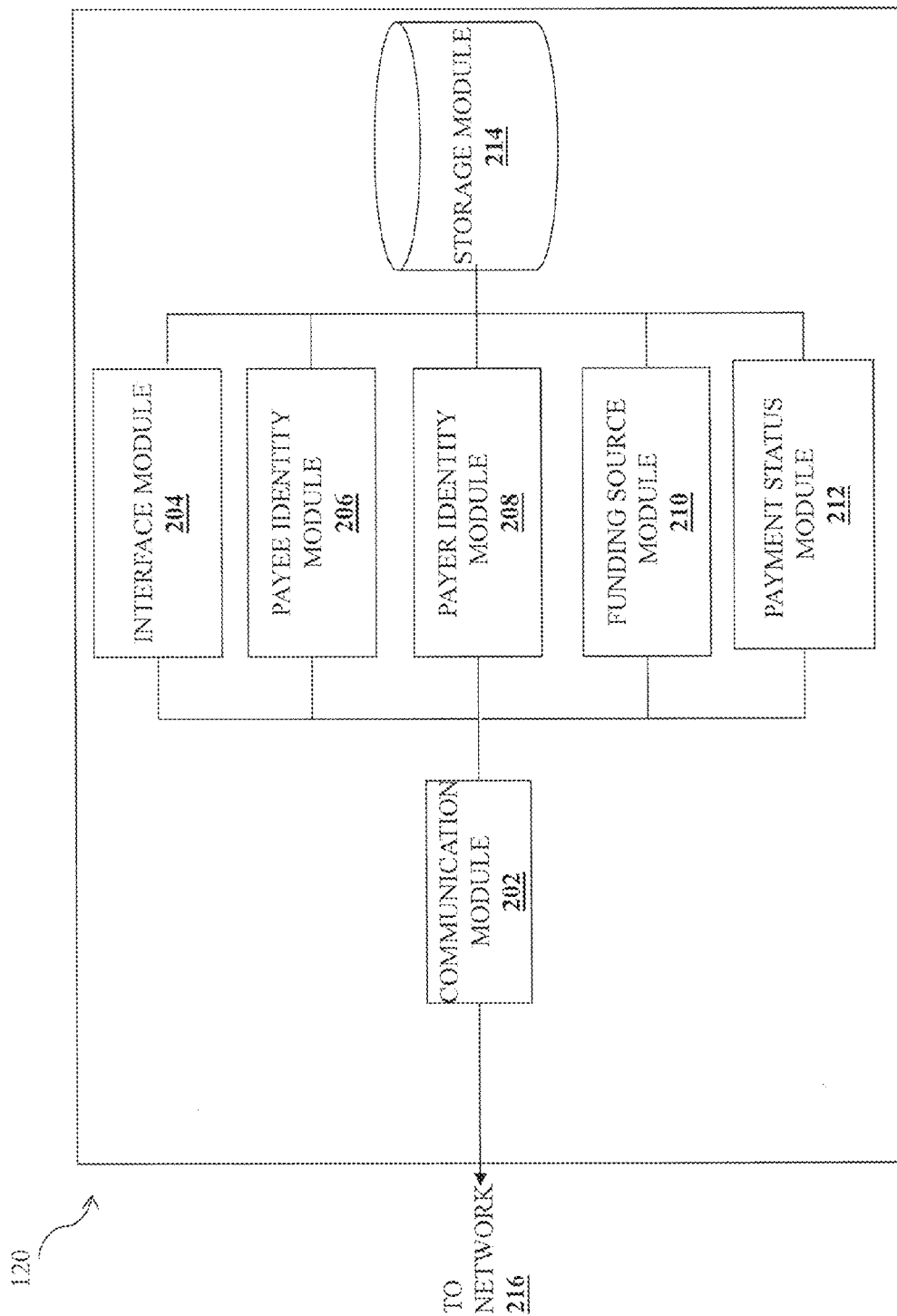
FIG. 2 is a block diagram illustrating a user device according to an embodiment of the present disclosure.

FIG. 2 illustrates an embodiment of first user device 120. The device 120 includes several components or modules, such as a communication module 202, interface module 204, payee identity module 206, payer identity module 208, funding source module 210, payment status module 212, and storage module 214.

The device 120 includes a communication module 202 that is coupled to the network 216 and to any or all of an interface module 204, payee identity module 206, payer identity module 208, funding source module 210, and payment status module 212, any of which may be coupled to a storage module 214. Any or all of the modules 202-212 may be implemented as a subsystem of the user device 120 including for example, a circuit, a hardware component, a hardware subcomponent, and/or a variety of other subsystems known in the art. Furthermore, any or all of the modules 202-212 may be preconfigured to perform their disclosed functionality, or may be configured by a processing system "on-the-fly" or as needed to perform their disclosed functionality. As such, any or all of the modules 202-212 may include pre-configured and dedicated circuits and/or hardware components of the first user device 120, or may be circuits and/or hardware components that are configured as needed.

For example, any or all of the modules 202-212 may be provided via one or more circuits that include resistors, inductors, capacitors, voltage sources, current sources, switches, logic gates, registers, and/or a variety of other circuit elements known in the art. One or more of the circuit elements in a circuit may be configured to provide the circuit(s) that cause the modules 202-212 to perform the functions described below. As such, in some embodiments, preconfigured and dedicated circuits may be implemented to perform the functions of the modules 202-212. In other embodiments, a processing system may execute instructions on a non-transitory, computer-readable medium to configure one or more circuits as needed to perform the functions of the modules 202-212.

The communication module 202 may be included as a separate module provided in the device 120, or may be provided using instructions stored on a computer-readable medium that, when executed by a processing system in the device 120, configure the communication module 202 to send and receive information over the network 216, as well as provide any of the other functionality that is discussed herein. The interface module 204 may be included as a separate module provided in the device 120, or may be provided using instructions stored on a computer-readable medium that, when executed by a processing system in the device 120, configure the interface module 204 to generate an intuitive interface for user 102, as well as provide any of the other functionality that is discussed herein. In some embodiments, the interface module 204 uses user 102's information, for example, transaction history, profile, demographic information, behavior, and/or information from social networking websites to generate the interface. In other embodiments, interface module 204 receives information from interface module 204, payee identity module 206, payer identity module 208, funding source module 210, and/or payment status module 212. The payee identity module 206 may be included as a separate module provided in the device 120, or may be provided using instructions stored on a computer-readable medium that, when executed by a processing system in the device 120, configure the payee identity module 206 to provide suggested recipients of payment to interface module 204, as well as provide any of the other functionality that is discussed herein. The payer identity module 208 may be included as a separate module provided in the device 120, or may be provided using instructions stored on a computer-readable medium that, when executed by a processing system in the device 120, configure the payer identity module 208 to provide suggested persons to request payment from to interface module 204. The funding source module 210 may be included as a separate module provided in the device 120, or may be provided using instructions stored on a computer-readable medium that, when executed by a processing system in the device 120, configure the funding source module 210 to provide available funding sources to interface module 204. The payment status module 212 may be included as a separate module provided in the device 120, or may be provided using instructions stored on a computer-readable medium that, when executed by a processing system in the device 120, configure the payment status module 212 to determine and provide one or more stages of completion of a payment transaction to interface module 204. Furthermore, other modules discussed above but not illustrated in FIG. 2 may be provided as separate modules on the device 120, or using instructions stored on a computer-readable medium similarly as discussed above. While the storage module 214 has been illustrated as located in the device 120, one of ordinary skill in the art will recognize that it may include multiple storage modules and may be connected to the modules 204-212 through the network 216 without departing from the scope of the present disclosure.

The one or more merchant servers 130, in various embodiments, may be maintained by one or more business entities (or in some cases, by a partner of a business entity that processes transactions on behalf of business entities). Examples of businesses entities include merchants, resource information companies, utilities, real estate management companies, social networking companies, etc., which offer various items for purchase and payment. In some embodiments, business entities may need registration of the user identity information as part of offering the items to the users 102, 104 over the network 160. As such, each of the one or more merchant servers 130 may include a merchant database 132 for identifying available items, which may be made available to the user devices 120, 140 for viewing and purchase by the users 102, 104. In one or more embodiments, users 102, 104 may complete a transaction such as purchasing the items via service provider server 180.

Each of the merchant servers 130, in one embodiment, may include a marketplace application 134, which may be configured to provide information over the network 160 to the user interface application 122, 142 of the user devices 120, 140. For example, first user 102 may interact with the marketplace application 134 through the user interface application 122 over the network 160 to search and view various items available for purchase in the merchant database 132.

Each of the merchant servers 130, in one embodiment, may include at least one merchant identifier 136, which may be included as part of the one or more items made available for purchase so that, e.g., particular items are associated with particular merchants. In one implementation, the merchant identifier 136 may include one or more attributes and/or parameters related to the merchant, such as business and banking information. The merchant identifier 130 may include attributes related to the merchant server or device 130, such as identification information (e.g., a serial number, a location address, GPS coordinates, a network identification number, etc.). In various embodiments, user 102 may conduct transactions (e.g., searching, selection, monitoring, purchasing, and/or providing payment for items) with each merchant server 130 via the service provider server 180 over the network 160.

A merchant website may also communicate (for example, using merchant server 130) with the service provider through service provider server 180 over network 160. For example, the merchant website may communicate with the service provider in the course of various services offered by the service provider to merchant website, such as payment intermediary between customers of the merchant website and the merchant website itself. For example, the merchant website may use an application programming interface (API) that allows it to offer sale of goods in which customers are allowed to make payment through the service provider, while users 102, 104 may have an account with the service provider that allows users 102, 104 to use the service provider for making payments to merchants that allow use of authentication, authorization, and payment services of service provider as a payment intermediary. The merchant website may also have an account with the service provider.

The service provider server 180, in one embodiment, may be maintained by a transaction processing entity or an online service provider, which may provide processing for financial transactions and/or information transactions between the first user 102, the second user 104, and one or more of the merchant servers 130. As such, the service provider server 180 includes a service application 182, which may be adapted to interact with the user devices 120, 140 and/or each merchant server 130 over the network 160 to facilitate the searching, selection, purchase, and/or payment of items by the users 102, 104 from one or more of the merchant servers 130. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service application 182, in one embodiment, utilizes a payment processing application 184 to process purchases and/or payments for financial transactions between the users 102, 104 and each of the merchant servers 130. In one implementation, the payment processing application 184 assists with resolving financial transactions through validation, delivery, and settlement. As such, the service application 182 in conjunction with the payment processing module 184 settles indebtedness between the users 102, 104 and each of the merchants 130, wherein accounts may be directly and/or automatically debited and/or credited of monetary funds in a manner as accepted by the banking industry.

The service provider server 180, in one embodiment, may be configured to maintain one or more user accounts and merchant accounts in an account database 186, each of which may include account information 188 associated with one or more individual users (e.g., first user 102 and second user 104) and merchants (e.g., one or more merchants associated with merchant servers 130). For example, account information 188 may include private financial information of users 102, 104 and each merchant associated with the one or more merchant servers 130, such as one or more account numbers, passwords, credit card information, banking information, or other types of financial information, which may be used to facilitate financial transactions between first user 102, second user 104, and the one or more merchants associated with the merchant servers 130. In various aspects, the methods and systems described herein may be modified to accommodate users and/or merchants that may or may not be associated with at least one existing user account and/or merchant account, respectively.

In one implementation, the users 102, 104 may have identity attributes stored with the service provider server 180, and users 102, 104 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate users 102, 104 with one or more particular user accounts maintained by the service provider server 180.

Figure 3:
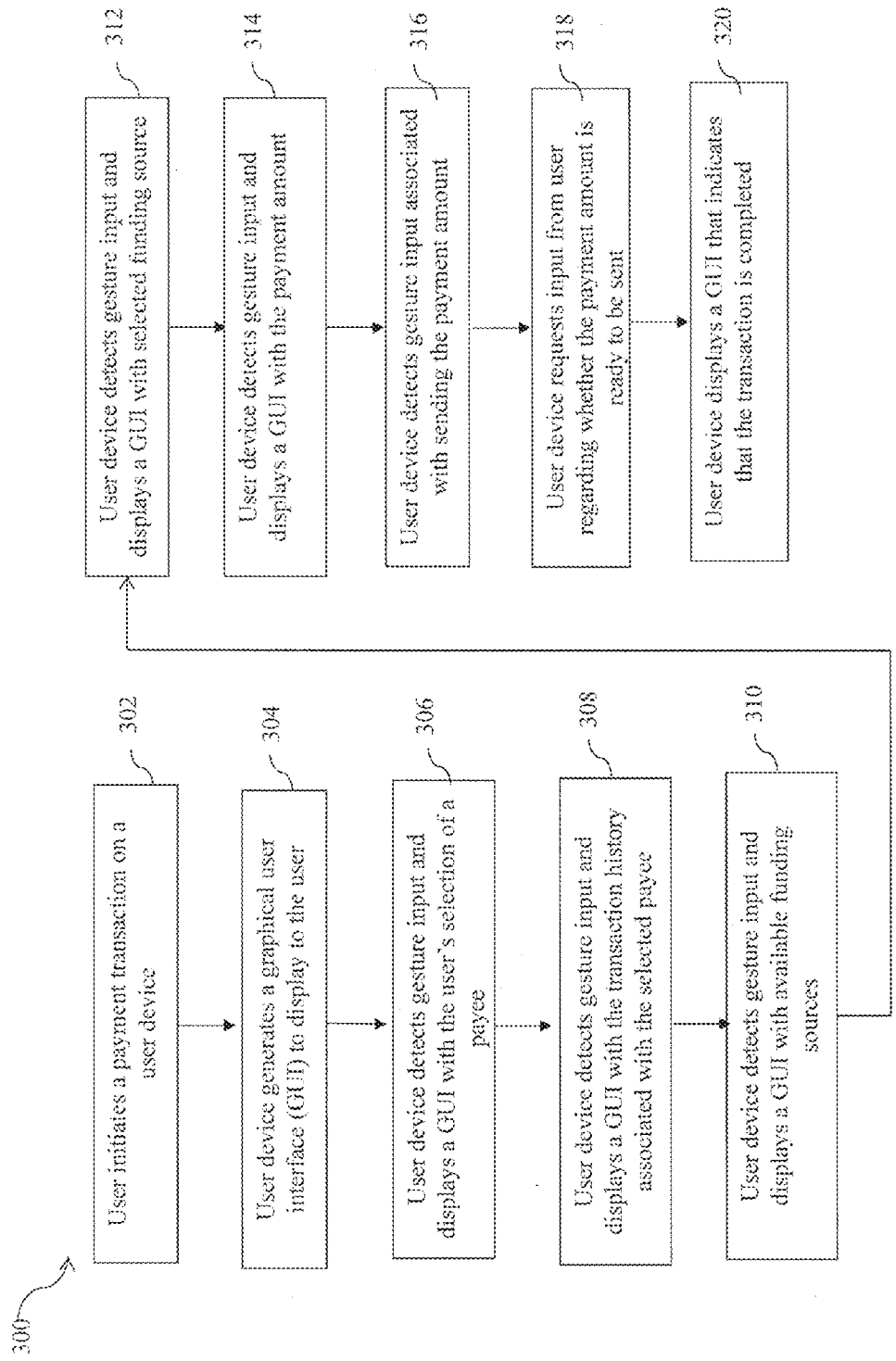
FIG. 3 is a flowchart showing a method for facilitating an electronic transaction on a user device according to an embodiment of the present disclosure.

Referring now to FIG. 3, a flowchart of a method 300 for facilitating an electronic transaction on a user device is illustrated according to an embodiment of the present disclosure. In various embodiments, the users 102, 104 each register with a service provider, which runs a mobile application. Registration may include signing up for the service and agreeing to any terms required by the service provider, such as through a user device. In one embodiment, the user device is a mobile computing device, such as a smart phone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

At step 302, first user 102 initiates a payment transaction on first user device 120. For example, first user 102 can log in to payment application 128 and choose an option of sending payment or requesting payment.

Figure 4A:
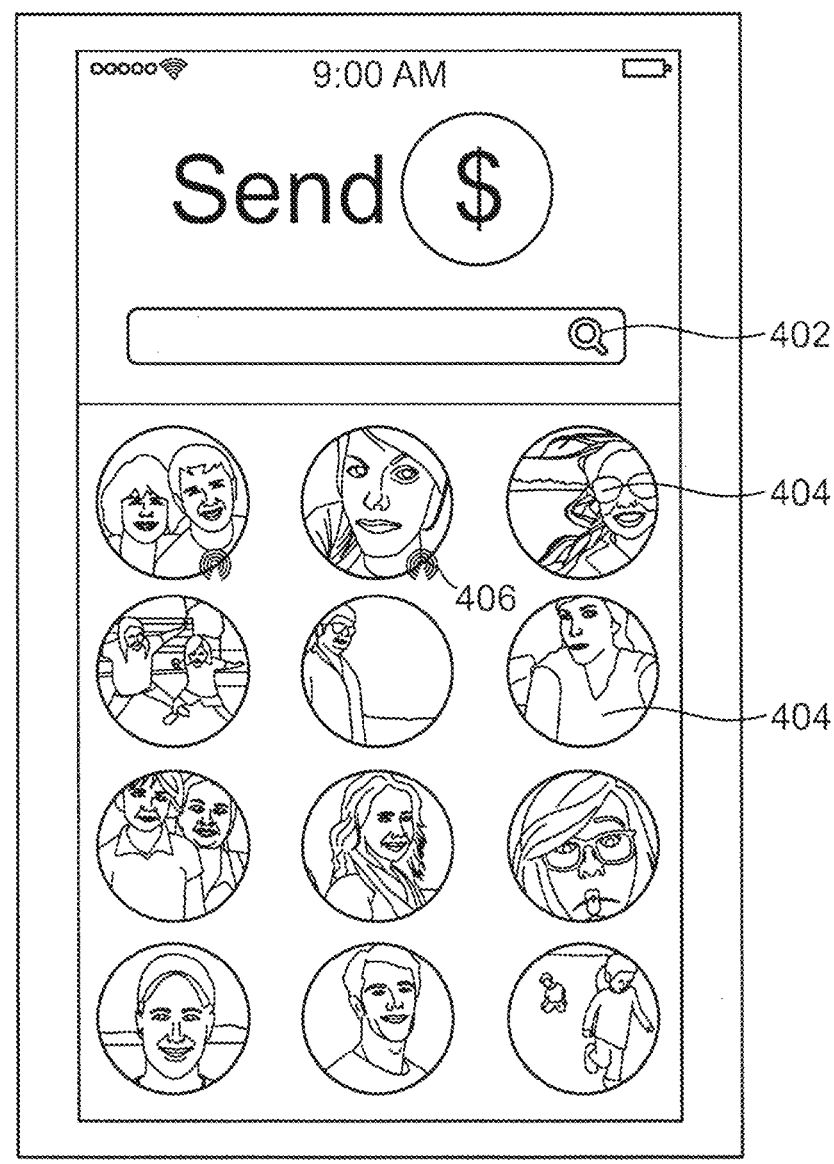
FIGS. 4A-4I are screenshots of user interfaces that illustrate a method of sending payment according to an embodiment of the present disclosure.

At step 304, interface module 204 generates a GUI to display to first user 102. As shown in FIG. 4A, an exemplary main page, screen, or display 400 includes a search field 402 and a group of images of friends or contacts 404. First user 102 may use the search field 402 to find a specific friend or contact. For example, a phone number, email address, first name, last name, or location can be entered into search field 402.

Friends in friend images 404 may be provided to interface module 204 by payee identity module 206 or payer identity module 208. In the example shown in FIG. 4A, payee identity module 208 identifies and provides suggested or intended payees (e.g. second user 104). The suggested payees may be based on one or more of, for example, transaction history (e.g., persons first user 102 borrowed money from and owes money to), phone contacts or electronic mail contact lists, location (e.g., persons near or in close proximity to first user 102), and contacts on social networking sites. In FIG. 4A, friends that are nearby or around first user 102 are identified with an airdrop icon 406. This feature can be useful when friends go out together for a meal, and one friend wants to pay back another friend for his or her share of the meal.

Figure 4B:
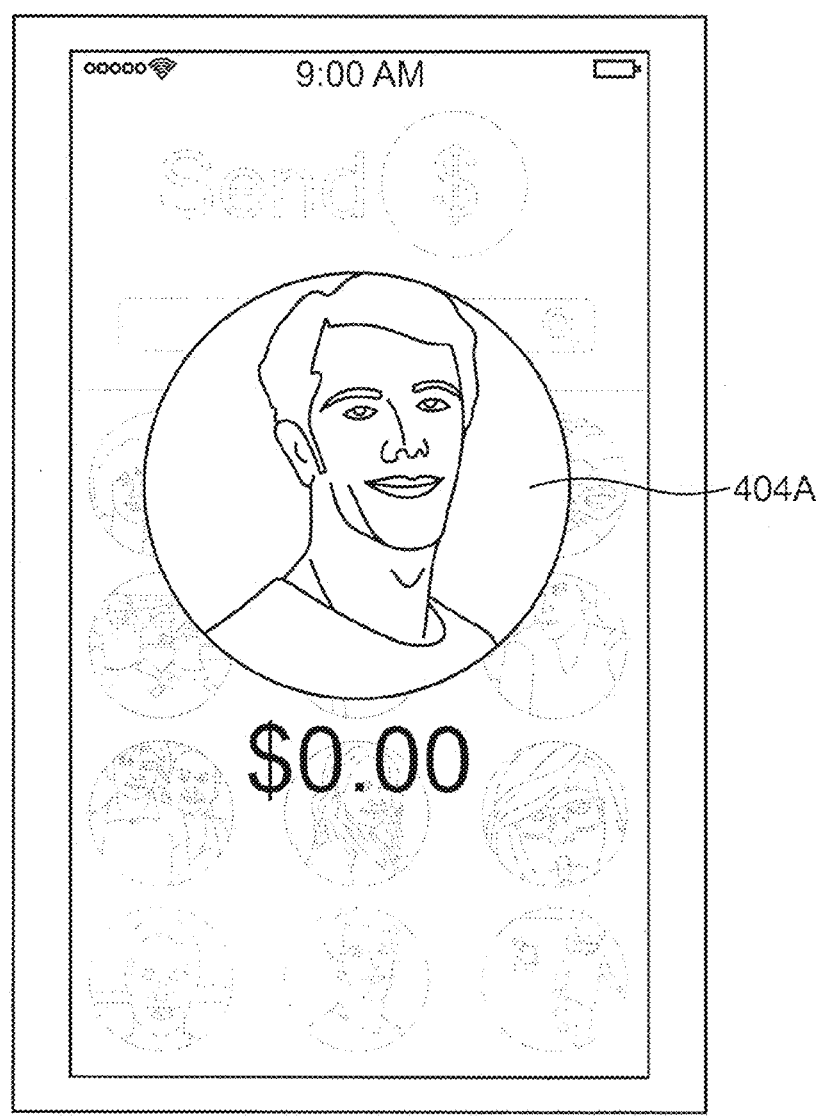

At step 306, in response to a gesture input received or detected from first user 102 that indicates a selection of a payee (e.g., second user 104), the interface module 204 causes to be displayed a GUI with first user 102's selection of second user 104. FIG. 4B illustrates an exemplary page 405 that is presented to first user 102 on first user device 120, including the image of selected payee 404A. The image 404A is large and takes up most of the page to ensure that first user 102 sees the image 404A and has made the correct selection. First user 102 can tap anywhere outside the image 404A to return to the main page 400.

Figure 4C:

At step 308, the interface module 204 detects a gesture input from first user 102 that indicates that first user 102 would like to view the transaction history 408 associated with the second user 104 in image 404A and causes to be displayed a GUI with the transaction history 408. In an exemplary embodiment, the gesture input is in the form of a horizontal swipe gesture to the left. The transaction history 408 may be obtained from storage module 214 or may be accessed by communicating with account database 186 of service provider server 180. FIG. 4C illustrates an exemplary page 410 that is displayed when first user 102 swipes friend image 404A to the left. As shown in FIG. 4C, the transaction history 408 includes amounts owed to second user 104 and associated dates. The large font of the words and numbers enables first user 102 to easily read and locate payment amounts. Tapping on any of the displayed amounts can populate the amount to be sent to second user 104 from first user 102. First user 102 can also specify a different amount (e.g., an amount that is not displayed in the transaction history) to pay second user 104. In another embodiment, first user 102 can select a displayed amount and then revise the displayed amount as further discussed below.

Figure 4D:
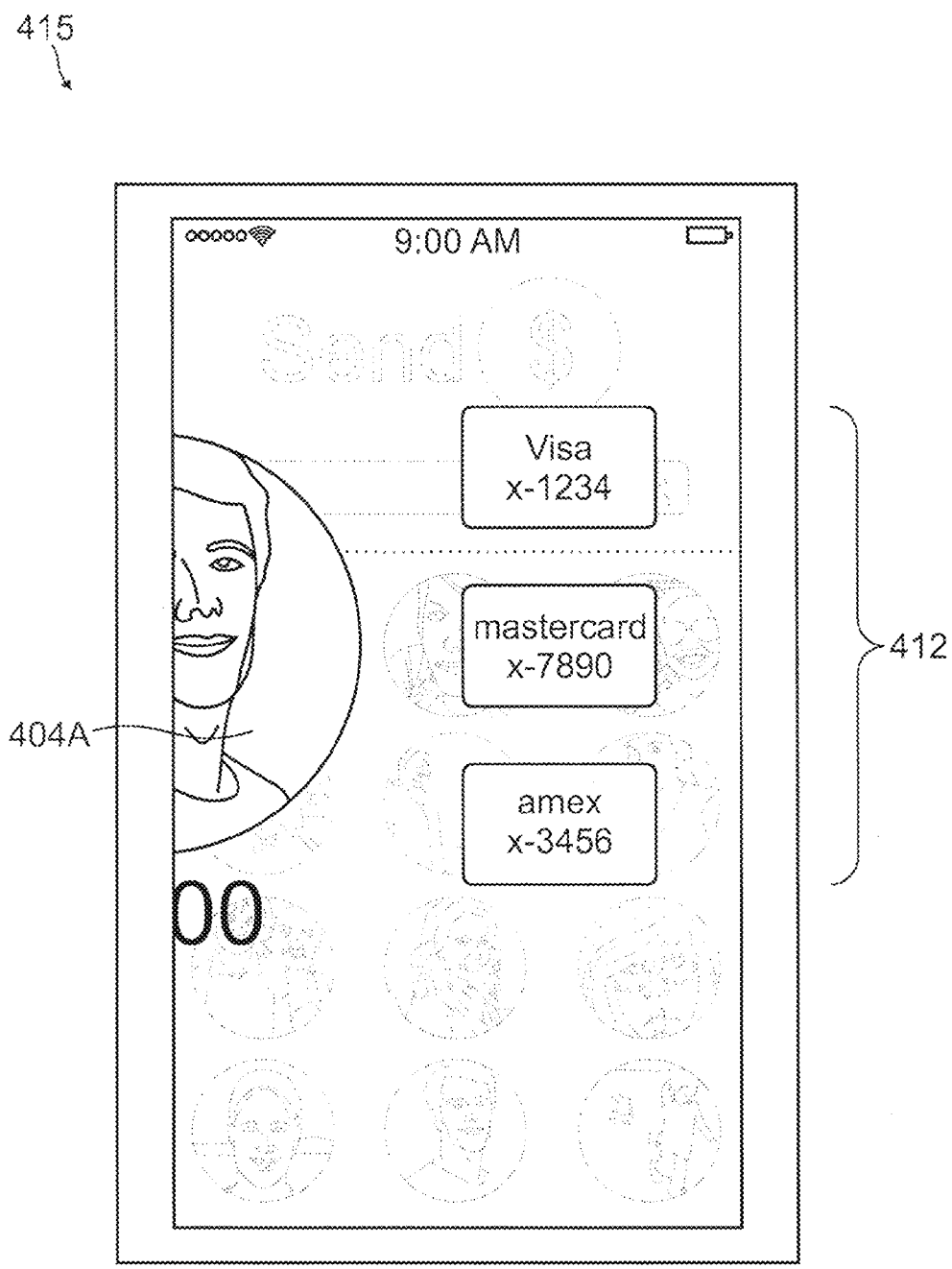

At step 310, the interface module 204 detects a gesture input from first user 102 that indicates that first user 102 would like to view available funding sources 412 and causes to be displayed a GUI with the available funding sources 412. In an exemplary embodiment, first user 102 horizontally swipes the friend image 404A to the right. FIG. 4D illustrates an exemplary page 415 that is displayed when first user 102 swipes friend image 404A to the right. The available funding sources 408 may include one or more bank accounts, credit cards, debit cards, gift cards, and service provider accounts. As shown, the funding sources are depicted as cards with large, easy to identify, simple text.

In various embodiments, funding source module 210 determines available or preferred funding sources of first user 102. For example, funding source module 210 analyzes transaction history (e.g., what funding sources or payment instrument first user 102 has used in the past to pay second user 104 or what funding sources first user 102 typically uses), available balances, costs associated with each funding source, available credit, and pending transactions. In exemplary embodiments, funding source module 210 transmits or communicates the preferred funding sources to interface module 204 for display.

Figure 4E:
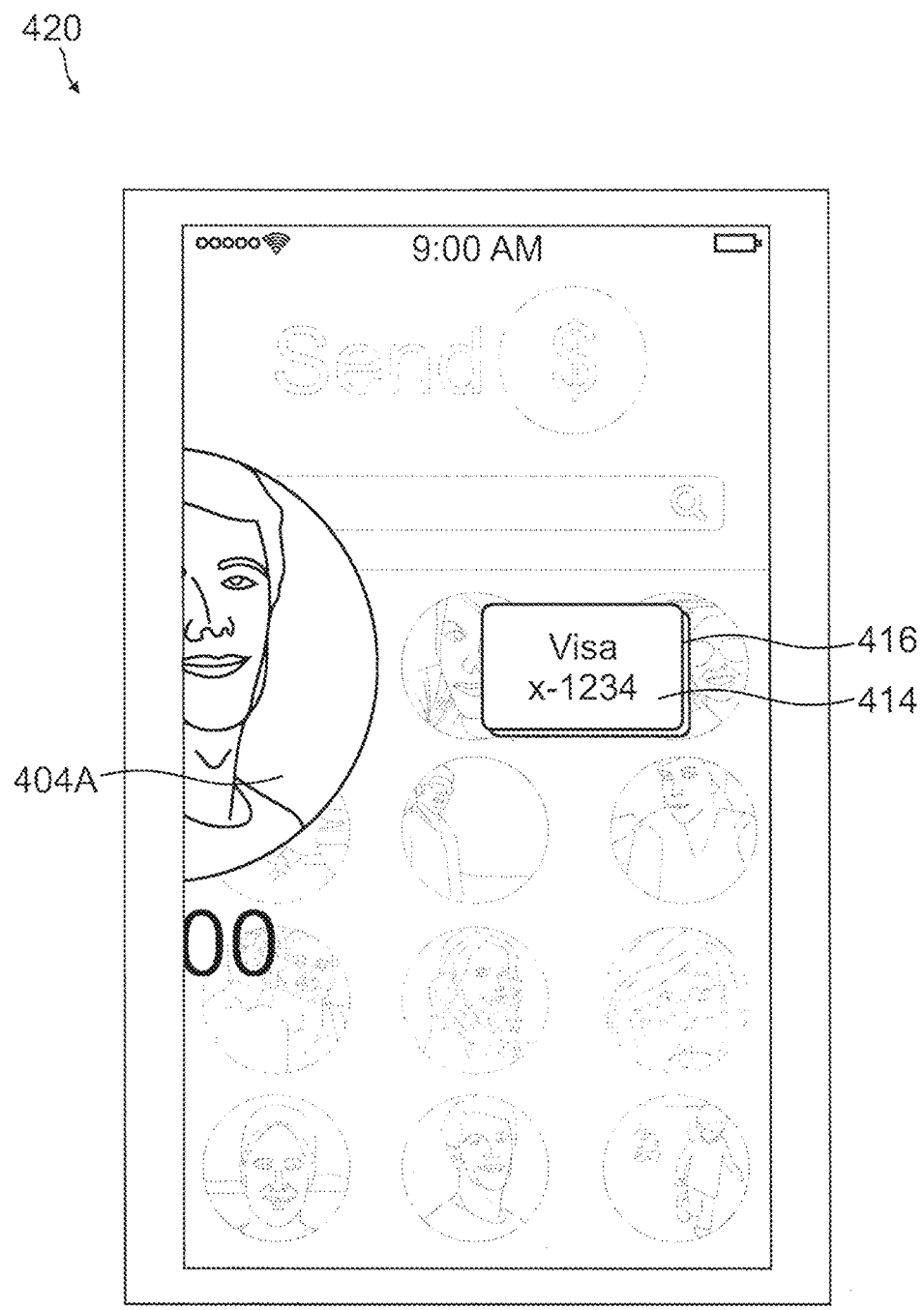

At step 312, interface module 204 detects a gesture input from first user 102 that indicates a selection of a funding source (e.g., first user 102 taps one of the funding sources) and causes to be displayed a GUI with the selected funding source 412. FIG. 4E illustrates an exemplary page 420 that is displayed when first user 102 selects the funding source 414. As shown, a line 416, which may be colored, outlines the selected funding source 412. In an exemplary embodiment, once a funding source is selected, the unselected funding sources animate behind the chosen funding source, and the page 420 automatically animates the friend image 404A back to the center of the screen.

At step 314, interface module 204 detects a gesture input from first user 102 that indicates how much he or she would like to send second user 104 and causes to be displayed a GUI with the payment amount. In an exemplary embodiment, interface module 204 receives a swiping input from first user 102. First user 102, in some embodiments, swipes his or her finger around the friend image 404A to indicate the payment amount 418. For example, the interface module 204 detects a vertical or upward swipe gesture that includes a contact 422 with the display and subsequent movement of the contact 422 along the display to a new location 424. In some embodiments, the swipe gesture by the first user 102 may be detected anywhere on the display. In other embodiments, the swipe gesture must be detected in a predefined area on the display, such as the area around friend image 404A.

Figure 4F:
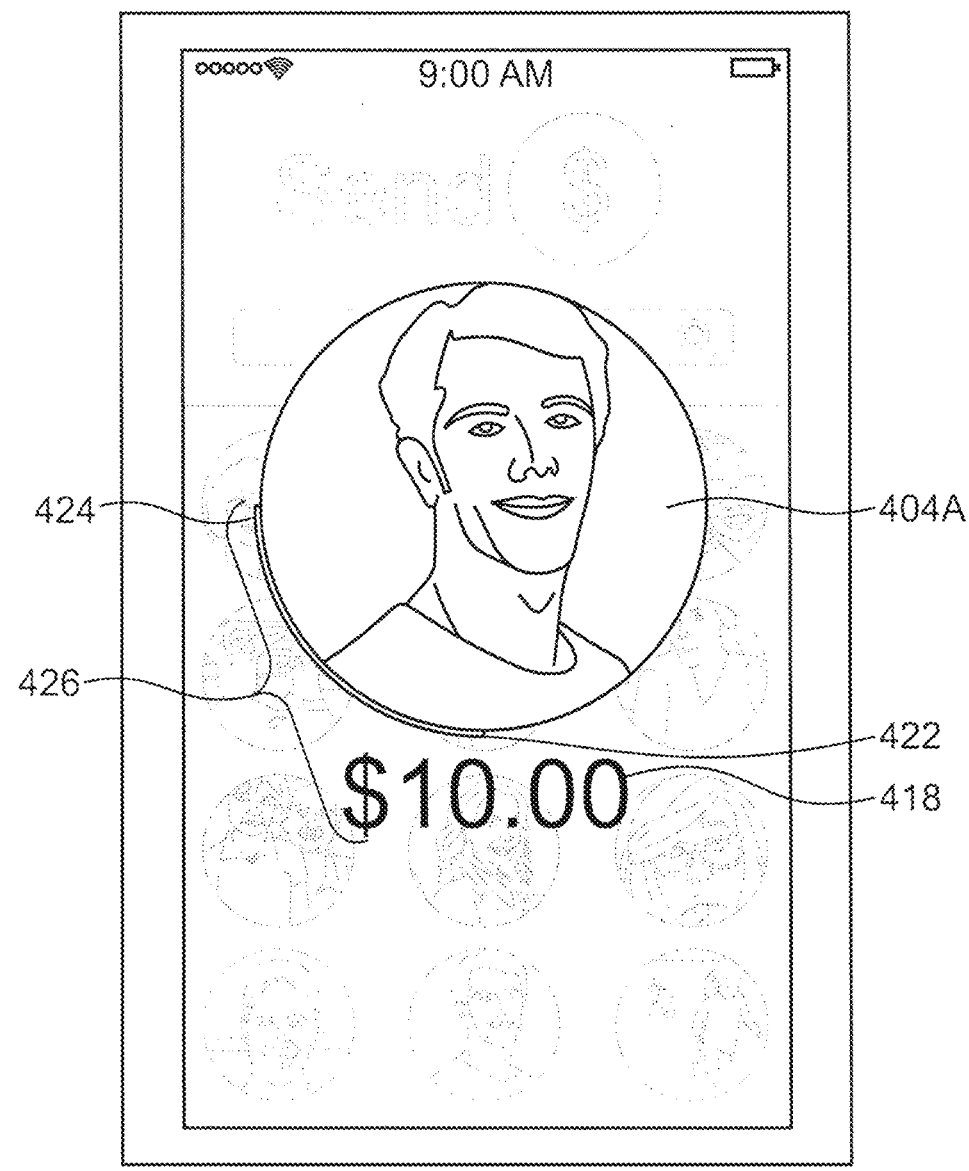

The speed or velocity of the swipe can indicate how fast to increase or decrease the payment amount 418. For example, a faster swipe builds increments in dollars, while a slower swipe builds increments in cents. In some embodiments, the size or length 426 of the swipe can indicate the size of the payment amount 418. For example, larger payment amounts are indicated by swipes that travel farther around the circle of friend image 404A, while smaller payment amounts are indicated by shorter distances around the circle. FIG. 4F illustrates an exemplary page 425 that is displayed when first user 102 partially swipes the circle around friend image 404A to the left. In this embodiment, the payment amount 418 is $10.00. In other embodiments, how long first user 102 makes contact with the display can indicate the size of the payment. For example, the longer first user 102 holds down or presses a button on the page 425, the larger the payment amount, and the less time first user 102 touches the display, the smaller the payment amount. In certain embodiments, the number of contact points detected on the display can indicate payment size. In these embodiments, the greater the number of contact points used (e.g., first user 102 places three fingers on the display rather than one or two) the larger the payment amount.

Figure 4G:
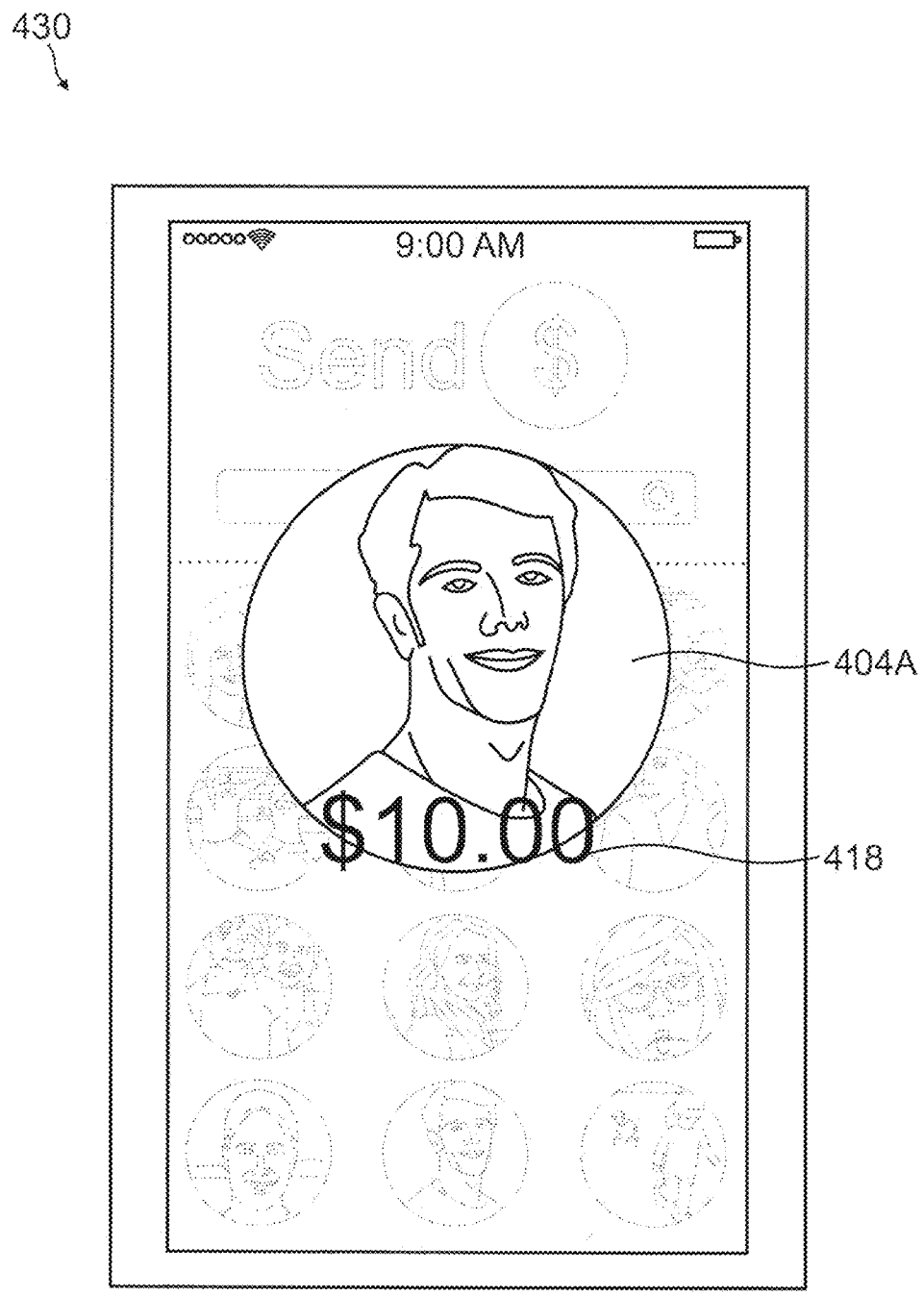

At step 316, interface module 204 detects a gesture input from first user 102 that indicates that he or she would like to send the payment amount 418. To send the amount to second user 104, first user 102 can drag the payment amount 418 into the circle of the friend image 404. FIG. 4G illustrates an exemplary page 430 that is displayed when first user 102 drags the payment amount 418 into the circle.

Figure 4H:
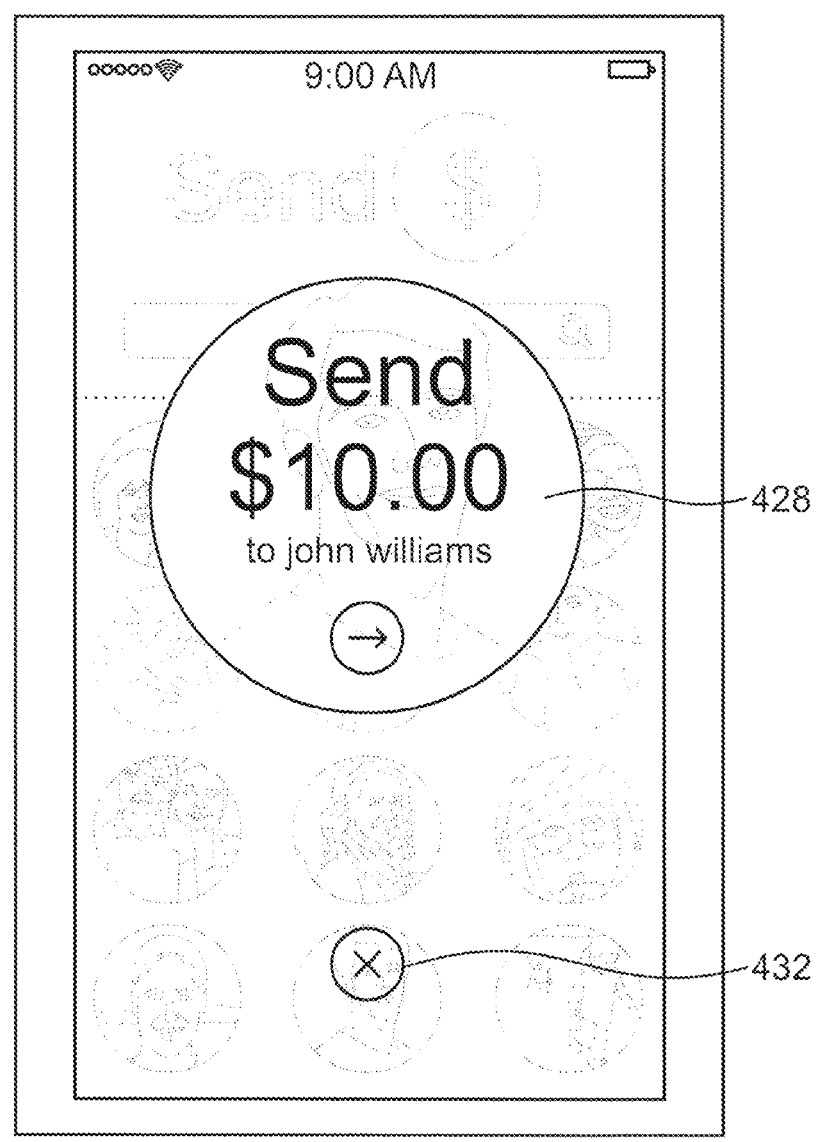

At step 318, interface module 204 causes to be displayed to first user 102 a GUI that requests first user 102 for input that first user 102 is ready to send the payment amount 418. FIG. 4H illustrates an exemplary page 435 that is presented to first user 102. As shown, a short and simple message 428 in large font is overlaid on friend image 404A. First user 102 can tap anywhere in the message circle 428 to send second user 104 the payment amount 418. In some embodiments, first user 102 can draw a checkmark in the message circle 428 to indicate that payment is approved. Should first user 102 wants to change anything in the payment request or to cancel, he or she can tap the "X" 432. First user 102 can also draw an "X" on the display. In exemplary embodiments, animation pulses around the message circle 428 as if suspended, waiting for the first user 102's tap.

Figure 4I:
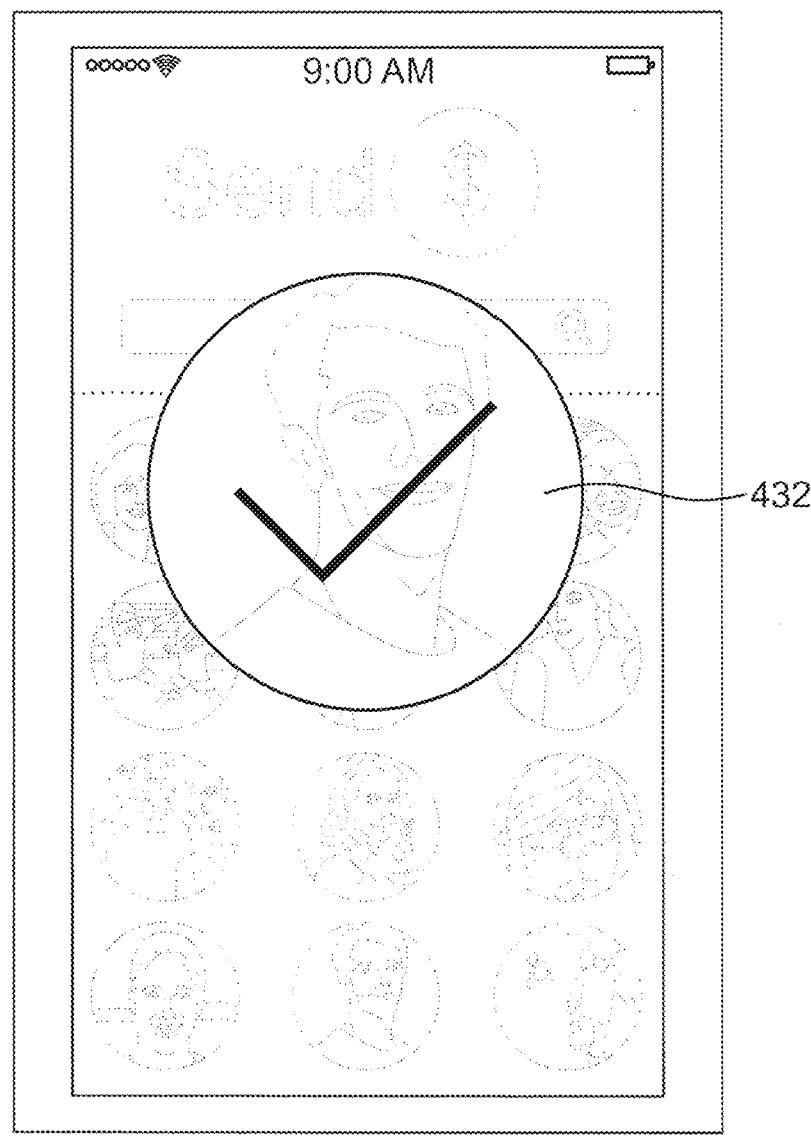

At step 320, interface module 204 causes to be displayed a GUI that shows that the transaction is completed. In various embodiments, payment status module 212 transmits a message to interface module 204 that payment has been processed. FIG. 4I illustrates an exemplary page 440 that is presented to first user 102. As shown, a checkmark 432 animates into the circle. The interface module 204, in some embodiments, automatically closes the page 440 and returns to the main page 400 so that the cycle can be started again.

Figure 5A:
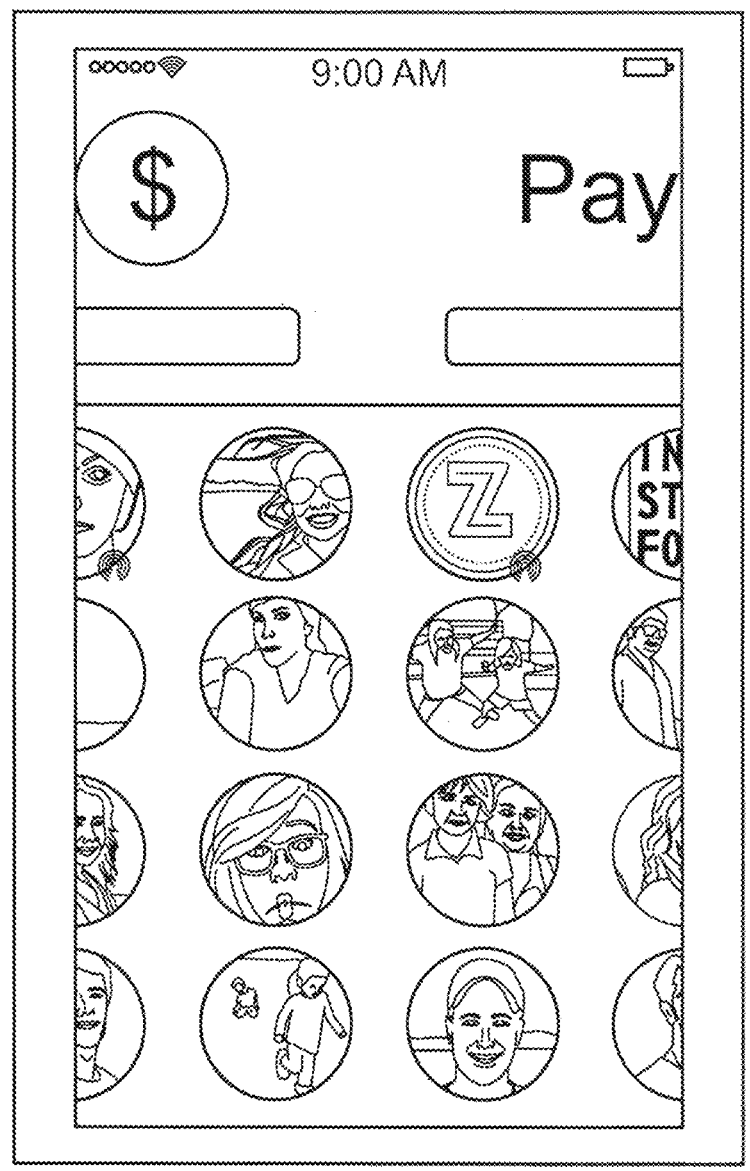
FIGS. 5A-5B are screenshots of user interfaces that illustrate a method of paying for goods or paying a merchant according to an embodiment of the present disclosure.
Figure 5B:
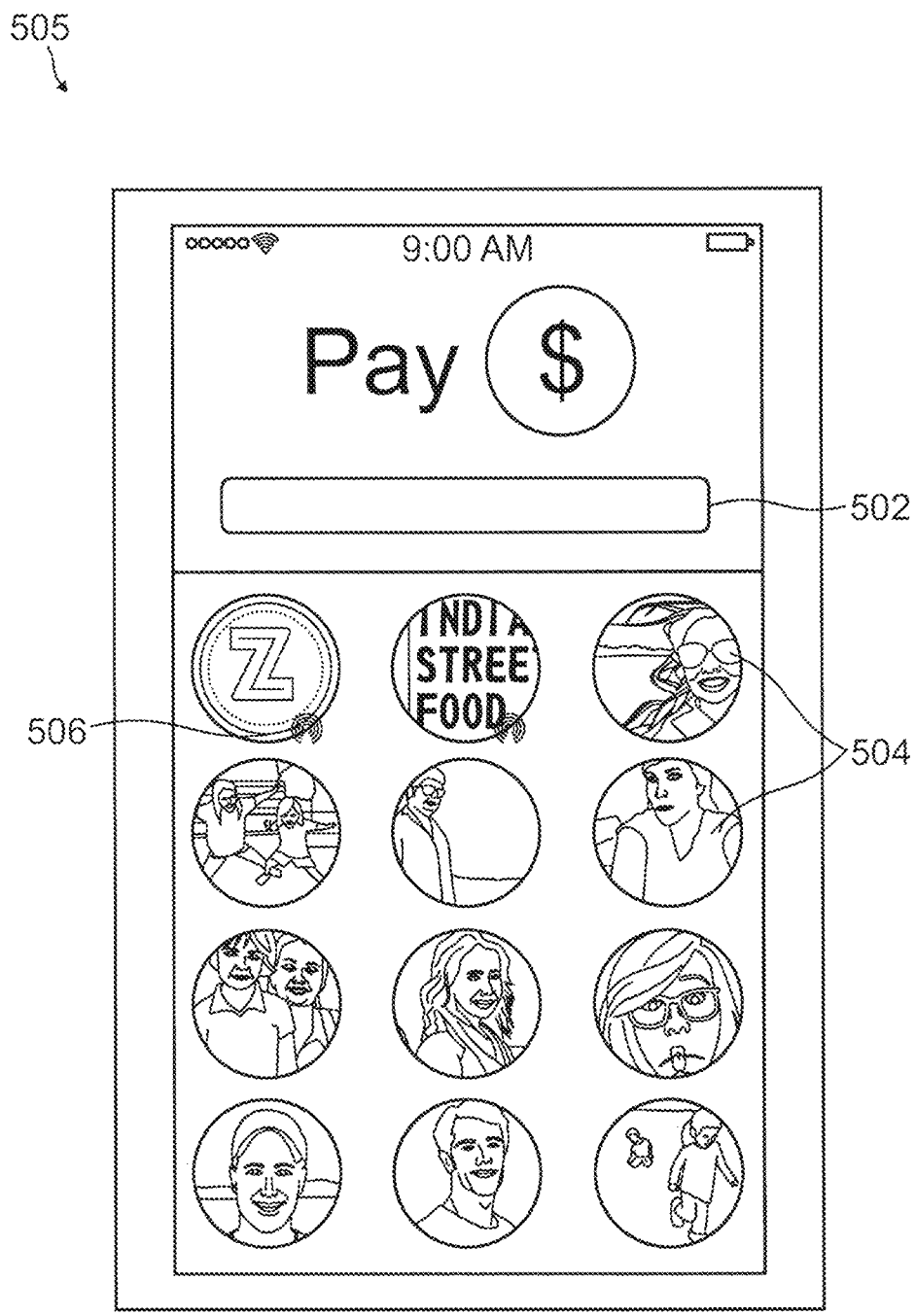

FIGS. 5A-5B are exemplary pages that are presented to first user 102 on first user device 120 when first user 102 wants to pay for goods or pay a merchant (e.g. a merchant associated with merchant server 130). Starting from the exemplary main page 400 of FIG. 4A, first user 102 can provide a gesture input on the main page 400. For example, first user 102 can swipe the main page 400 to the right to reveal the pay money page 505. FIG. 5A illustrates an exemplary page 500 that shows a portion of main page 400 and a portion of pay money page 505. In various embodiments, a tutorial is provided to first user 102 to introduce first user 102 to the different functions available when first user 102 uses the main page 400 and/or pay money page 505 for the first time. The pay money page 505 is similar to the send money page 400, and works in substantially the same way as described above with respect to FIGS. 4B-4I. As shown, the pay money page 505 also includes a search field 502, a compilation of friend and merchant images 504, and airdrop icons 506.

Figure 6:
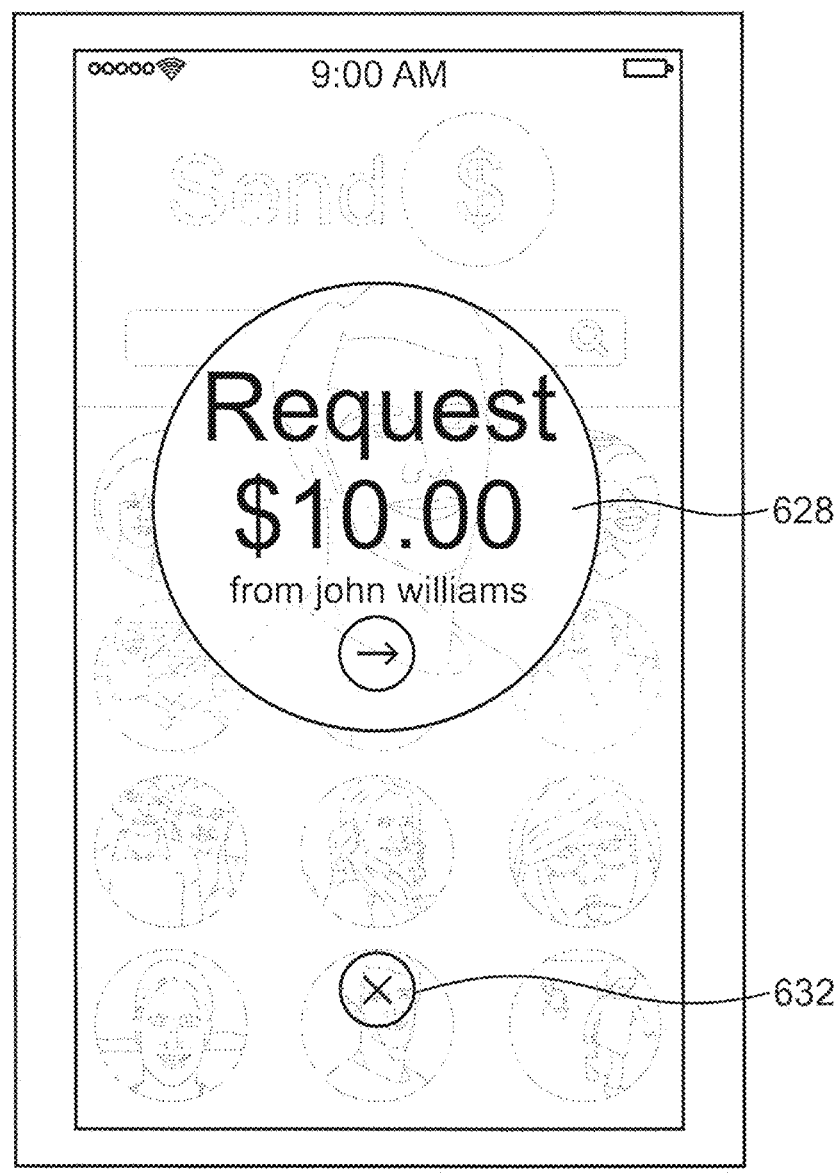
FIG. 6 is a screenshot of a user interface that is a presented to a user when requesting payment.

FIG. 6 is an exemplary page 600 that is presented to first user 102 when first user 102 wants to request money from a friend. To request money, first user 102 can follow substantially the same steps outlined in FIGS. 4A-4C and 4F. Instead of dragging the payment amount to the friend circle as shown in FIG. 4G, first user 102 can drag second user 104 to the payment amount and trigger the exemplary page 600 shown in FIG. 6. As shown, a short and simple message 628 in large font is overlaid on the friend image. First user 102 can tap anywhere in the message circle 428 to request the payment amount from the second user 104. Should first user 102 want to change anything in the payment request or to cancel, he or she can tap the "X" 632.

The present disclosure describes systems and methods that make paying with a user device more convenient. A user is able to use various gesture inputs to indicate details of a transaction, rather than having to read and type words and numbers. Advantageously, the present disclosure provides GUIs that allow a user to explore and navigate friends or contacts that are nearby, easily populate transaction amounts using, for example, the speed of a gesture, and complete transactions with minimal clicking.

Figure 7:
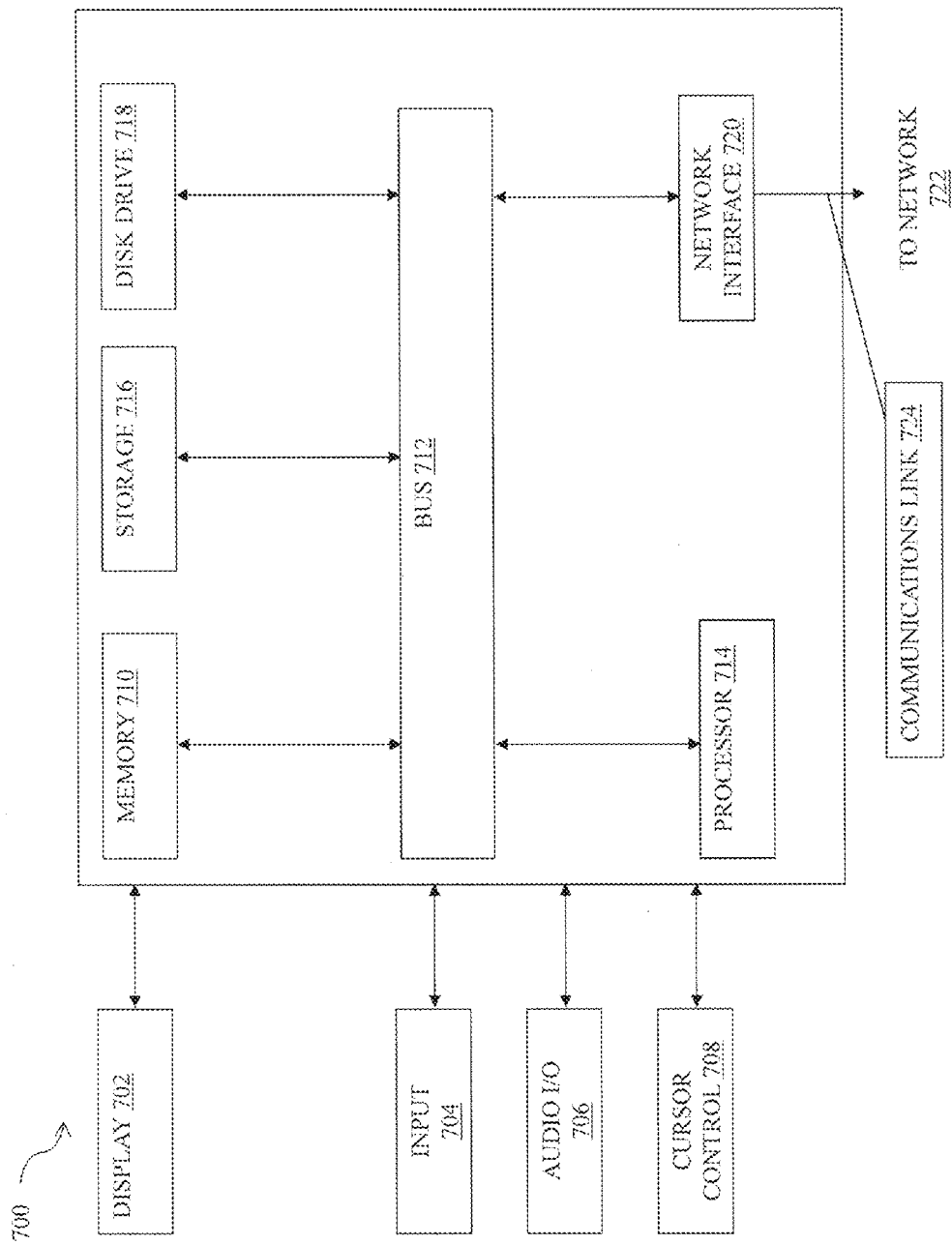
FIG. 7 is a block diagram of a system for implementing a device according to an embodiment of the present disclosure.

Referring now to FIG. 7, a block diagram of a system 700 is illustrated suitable for implementing embodiments of the present disclosure, including user devices 120 and 140, one or more merchant servers or devices 130, and service provider server or device 180. In various implementations, the user devices 120 and 140 may include a mobile cellular phone, personal computer (PC), laptop, wearable computing device, etc. adapted for wireless communication, and the merchant server 130 and service provider server 180 may comprise a network computing device, such as a server. Thus, it should be appreciated that the devices 120, 130, 140, and 180 may be implemented as computer system 700 in a manner as follows.

Computer system 700 includes a bus 712 or other communication mechanism for communicating information data, signals, and information between various components of computer system 700. Components include an input/output (I/O) component 704 that processes a user (e.g., sender, recipient, service provider) action, such as selecting keys from a keypad/keyboard, selecting one or more buttons or links, etc., and sends a corresponding signal to bus 712. I/O component 704 may also include an output component, such as a display 702 and a cursor control 708 (such as a keyboard, keypad, mouse, etc.). An optional audio input/output component 706 may also be included to allow a user to use voice for inputting information by converting audio signals. Audio I/O component 706 may allow the user to hear audio. A transceiver or network interface 720 transmits and receives signals between computer system 700 and other devices, such as another user device, a merchant server, or a service provider server via network 722. In one embodiment, the transmission is wireless, although other transmission mediums and methods may also be suitable. A processor 714, which can be a micro-controller, digital signal processor (DSP), or other processing component, processes these various signals, such as for display on computer system 700 or transmission to other devices via a communication link 724. Processor 714 may also control transmission of information, such as cookies or IP addresses, to other devices.

Components of computer system 700 also include a system memory component 710 (e.g., RAM), a static storage component 716 (e.g., ROM), and/or a disk drive 718. Computer system 700 performs specific operations by processor 714 and other components by executing one or more sequences of instructions contained in system memory component 710. For example, processor 714 can detect one or more gesture inputs and display one or more GUIs in response to the gesture inputs. Logic may be encoded in a computer readable medium, which may refer to any medium that participates in providing instructions to processor 714 for execution. Such a medium may take many forms, including but not limited to, non-volatile media, volatile media, and transmission media. In various implementations, non-volatile media includes optical or magnetic disks, volatile media includes dynamic memory, such as system memory component 710, and transmission media includes coaxial cables, copper wire, and fiber optics, including wires that comprise bus 712. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
a non-transitory memory storing instructions; and
one or more hardware processors coupled to the non-transitory memory and configured to read the instructions from the non-transitory memory to cause the system to perform operations comprising:
displaying, on a graphical user interface (GUI) of the system, a list of contacts of a user;
receiving a selection of a contact from the list of contacts;
providing, via the GUI, available funding sources to the user;
receiving a selection of a funding source from the available funding sources from the user;
providing, via the GUI, a payment indicator;
receiving, via the GUI, a touch input that is associated with the payment indicator;
determining a transaction amount based on a time-dependent measurement of the touch input; and
providing, for display via the GUI, the transaction amount along with the payment indicator.

2. The system of claim 1, wherein the time-dependent measurement of the touch input indicates a speed of the touch input.

3. The system of claim 2, wherein the operations further comprise analyzing the speed of the touch input to determine a rate of increase or a rate of decrease of the transaction amount.

4. The system of claim 1, wherein the time-dependent measurement of the touch input indicates a length of the touch input.

5. The system of claim 4, wherein the operations further comprise analyzing the length of the touch input to determine a size of the transaction amount.

6. The system of claim 1, wherein the determining the transaction amount is further based on a number of contact points used by the touch input.

7. The system of claim 1, wherein the payment indicator comprises an image of the contact.

8. The system of claim 1, wherein the operations further comprise receiving an input, via the GUI, that indicates an approval of the transaction amount.

9. The system of claim 8, wherein the input indicates a gesture that drags and drops an image, displayed on the GUI, of the contact onto another image of another contact, the gesture indicating a request of a payment from the contact to the another contact.

10. The system of claim 8, wherein the input indicates a gesture that drags and drops the transaction amount onto an image, displayed on the GUI, of the contact, the gesture indicating a request to pay the contact.

11. The system of claim 8, wherein the input indicates a gesture that drags and drops an image, displayed on the GUI, of the contact onto the transaction amount, the gesture indicating a request of a payment from the contact.

12. A method, comprising:
generating, for display on a display device, a payment graphical user interface (GUI);
providing, via the payment GUI, a payment indicator;
receiving, via the payment GUI, a touch input that is associated with the payment indicator;
determining a transaction amount based on a time-dependent measurement of the touch input; and
providing, for display via the payment GUI, the transaction amount along with the payment indicator.

13. The method of claim 12, wherein the time-dependent measurement of the touch input indicates a speed of the touch input.

14. The method of claim 13, further comprising analyzing the speed of the touch input to determine a rate of increase or a rate of decrease of the transaction amount.

15. The method of claim 12, wherein the time-dependent measurement of the touch input indicates a length of the touch input.

16. The method of claim 15, further comprising analyzing the length of the touch input to determine a size of the transaction amount.

17. The method of claim 12, wherein the determining the transaction amount is further based on a number of contact points used by the touch input.

18. A non-transitory machine-readable medium having stored thereon machine-readable instructions executable to cause performance of operations comprising:
generating, for display on a display device, a payment graphical user interface (GUI) comprising a list of contacts of a user;
providing, via the payment GUI, a payment indicator comprising an image of a selected contact from the list of contacts;
receiving, via the payment GUI, a touch input that is associated with the payment indicator;
determining a transaction amount based on a time-dependent measurement of the touch input; and
providing, for display via the payment GUI, the transaction amount along with the payment indicator.

19. The non-transitory machine-readable medium of claim 18, wherein the time-dependent measurement of the touch input indicates a speed of the touch input.

20. The non-transitory machine-readable medium of claim 18, wherein the time-dependent measurement of the touch input indicates a length of the touch input.

* * * * *